(12) United States Patent
Tao et al.

(10) Patent No.: US 9,155,179 B2
(45) Date of Patent: Oct. 6, 2015

(54) TARGET FOR EXTREME ULTRAVIOLET LIGHT SOURCE

(71) Applicant: ASML Netherlands B.V., Veldhoven (NL)

(72) Inventors: Yezheng Tao, San Diego, CA (US); Robert J. Rafac, Encinitas, CA (US); Igor V. Fomenkov, San Diego, CA (US); Daniel J. W. Brown, San Diego, CA (US); Daniel J. Golich, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/550,421

(22) Filed: Nov. 21, 2014

(65) Prior Publication Data

US 2015/0076374 A1    Mar. 19, 2015

Related U.S. Application Data

(63) Continuation of application No. 14/310,972, filed on Jun. 20, 2014, now Pat. No. 8,912,514, which is a continuation of application No. 13/830,380, filed on Mar. 14, 2013, now Pat. No. 8,791,440.

(51) Int. Cl.
*H05G 2/00* (2006.01)
*G21K 5/04* (2006.01)
(Continued)

(52) U.S. Cl.
CPC ............... *H05G 2/008* (2013.01); *G21K 5/02* (2013.01); *H01S 3/10* (2013.01); *H05G 2/005* (2013.01)

(58) Field of Classification Search
CPC ....... H05G 2/008; H05G 2/003; H05G 2/005; H05G 2/006; G03F 7/70033; G03F 7/70916; G21K 5/00; G21K 5/02; G21K 5/04; G21K 5/08

USPC ............ 250/504 R, 493.1, 423 R, 492.1, 425, 250/432 R; 372/29.014; 378/143
See application file for complete search history.

(56) References Cited

U.S. PATENT DOCUMENTS 6,973,164 B2   12/2005   Hartlove
7,239,686 B2    7/2007   Berglund
(Continued)

FOREIGN PATENT DOCUMENTS

WO    2011/102277 A1    8/2011
WO    2011/122397 A1    10/2011

OTHER PUBLICATIONS

Larsen. Jon T., "Absorption and Profile Modification on Spherical Targets for .25 <λ< 2 microns," Presentation at the 8th Annual Conference on Anomalous Absorption of Electromagnetic Waves, Apr. 19-21, 1978, 48 pages.
(Continued)

*Primary Examiner* — David A Vanore
(74) *Attorney, Agent, or Firm* — DiBerardino McGovern IP Group LLC

(57) ABSTRACT

Techniques for forming a target and for producing extreme ultraviolet light include releasing an initial target material toward a target location, the target material including a material that emits extreme ultraviolet (EUV) light when converted to plasma; directing a first amplified light beam toward the initial target material, the first amplified light beam having an energy sufficient to form a collection of pieces of target material from the initial target material, each of the pieces being smaller than the initial target material and being spatially distributed throughout a hemisphere shaped volume; and directing a second amplified light beam toward the collection of pieces to convert the pieces of target material to plasma that emits EUV light.

31 Claims, 15 Drawing Sheets

(51) Int. Cl.
*G21K 5/08* (2006.01)
*H01S 3/10* (2006.01)
*G21K 5/02* (2006.01)

(56) References Cited

U.S. PATENT DOCUMENTS

| | | | |
|---|---|---|---|
| 7,491,954 B2 | 2/2009 | Bykanov | |
| 7,608,846 B2 | 10/2009 | Nakano | |
| 7,916,388 B2 | 3/2011 | Bykanov | |
| 7,923,705 B2* | 4/2011 | Moriya et al. | 250/493.1 |
| 7,999,241 B2* | 8/2011 | Nagai et al. | 250/504 R |
| 8,242,472 B2* | 8/2012 | Moriya et al. | 250/504 R |
| 8,324,600 B2* | 12/2012 | Hayashi et al. | 250/504 R |
| 8,791,440 B1* | 7/2014 | Tao et al. | 250/504 R |
| 8,872,143 B2* | 10/2014 | Rafac et al. | 250/504 R |
| 8,885,680 B2* | 11/2014 | Nakarai et al. | 372/29.014 |
| 2006/0255298 A1 | 11/2006 | Bykanov | |
| 2007/0170377 A1* | 7/2007 | Nakano | 250/504 R |
| 2010/0051831 A1 | 3/2010 | Tao | |
| 2010/0181503 A1* | 7/2010 | Yanagida et al. | 250/504 R |
| 2011/0057126 A1* | 3/2011 | Hoshino et al. | 250/504 R |
| 2011/0170079 A1* | 7/2011 | Banine et al. | 355/30 |
| 2011/0317256 A1 | 12/2011 | Hou | |
| 2012/0092746 A1 | 4/2012 | Hou | |
| 2012/0228525 A1* | 9/2012 | Moriya et al. | 250/504 R |
| 2012/0235066 A1 | 9/2012 | Ershov | |
| 2012/0243566 A1* | 9/2012 | Hori et al. | 372/27 |
| 2012/0248344 A1* | 10/2012 | Wakabayashi et al. | 250/504 R |
| 2012/0305811 A1* | 12/2012 | Wakabayashi et al. | 250/504 R |
| 2012/0307851 A1* | 12/2012 | Hori et al. | 372/27 |
| 2012/0313016 A1* | 12/2012 | Fleurov et al. | 250/504 R |
| 2012/0319014 A1 | 12/2012 | Moriya | |
| 2013/0105712 A1* | 5/2013 | Yanagida et al. | 250/504 R |
| 2013/0119232 A1* | 5/2013 | Moriya et al. | 250/201.1 |
| 2013/0146682 A1* | 6/2013 | Ishihara et al. | 239/590 |
| 2013/0320232 A1* | 12/2013 | Hori et al. | 250/432 R |
| 2014/0084183 A1* | 3/2014 | Wakabayashi et al. | 250/492.1 |
| 2014/0183379 A1 | 7/2014 | Hori | |

OTHER PUBLICATIONS

Garban-Labaune et al., "Resonance Absorption in CO2 Laser-Plane Targets Interaction Experiments", Journal De Physique-Lettres, vol. 41, No. 19, Oct. 1980, pp. 463-467.

Nakano et al., "Sn Droplet Target Development for Laser Produced Plasma EUV Light Source," Proc. SPIE, Emerging Lithographic Technologies XII, vol. 6921, 2008, 8 pages.

Fujimoto et al.,"Development of Laser-Produced Tin Plasma-Based EUV Light Source Technology for HVM EUV Lithography", Physics Research International, vol. 2012, Article ID 249495, Jun. 2012, pp. 1-11.

International Search Report and Written Opinion received for PCT Patent Application No. PCT/US2014/017496, mailed Mar. 20, 2014, 7 pages.

\* cited by examiner

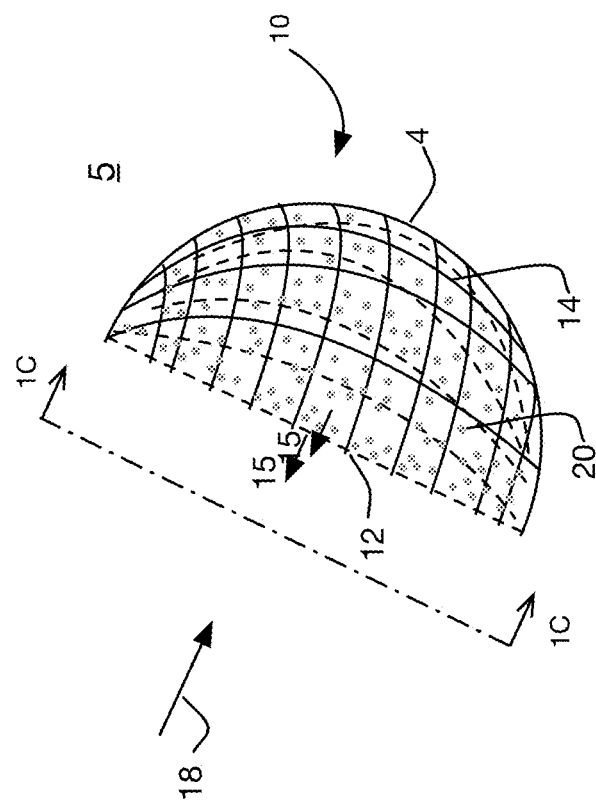
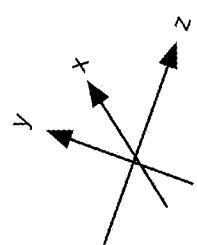
FIG. 1A

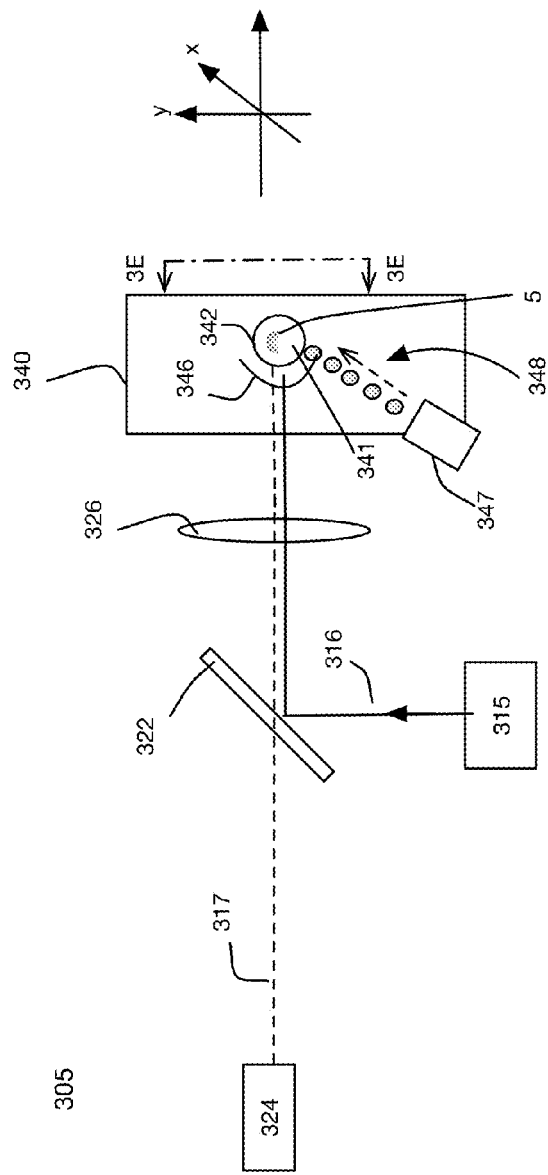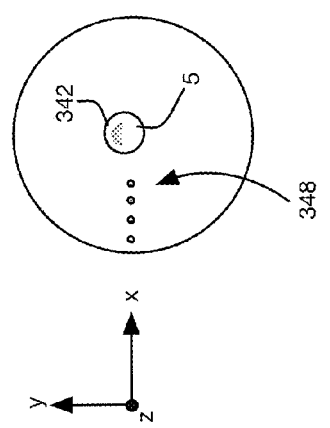
FIG. 3D
FIG. 3E

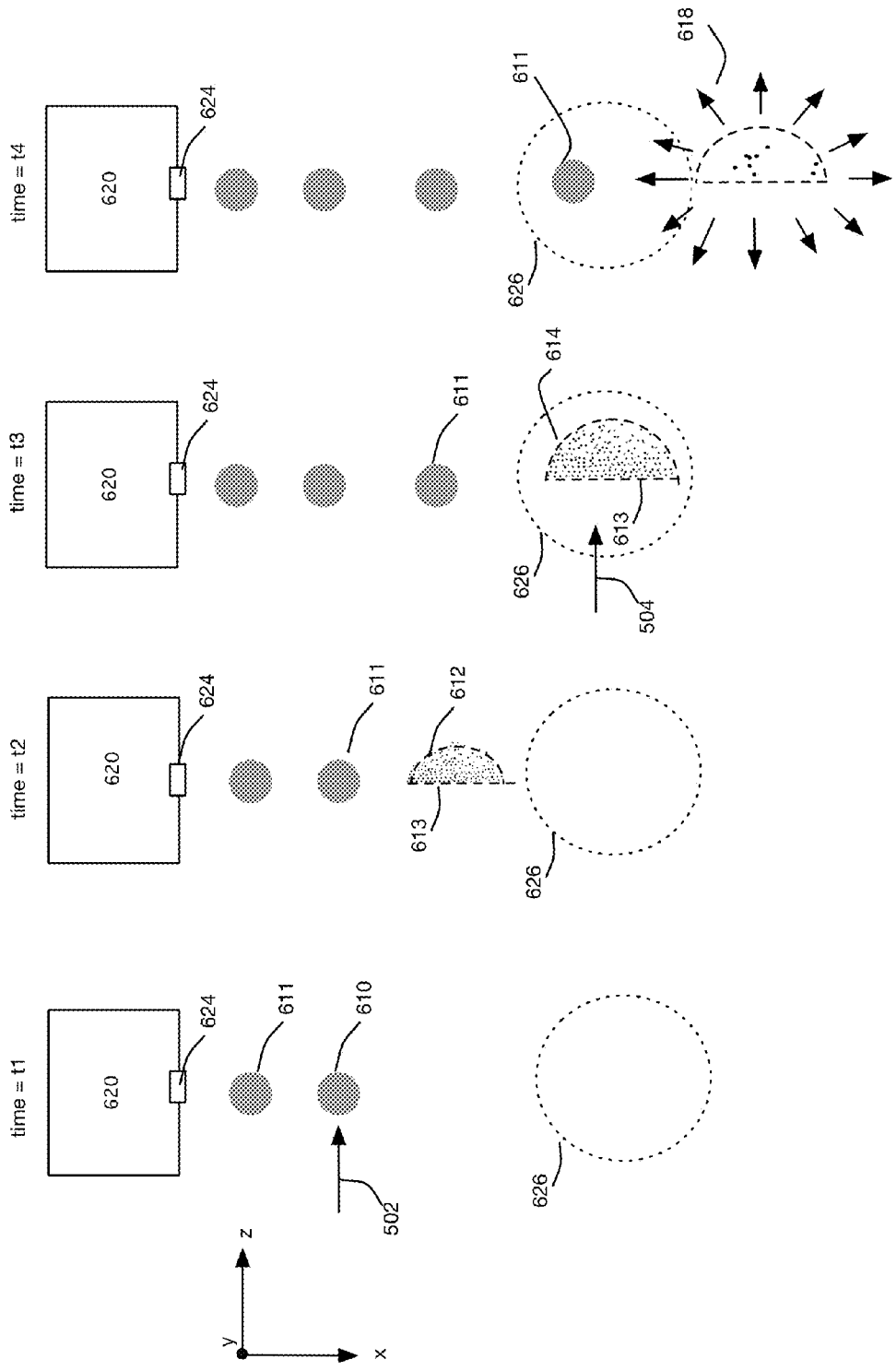

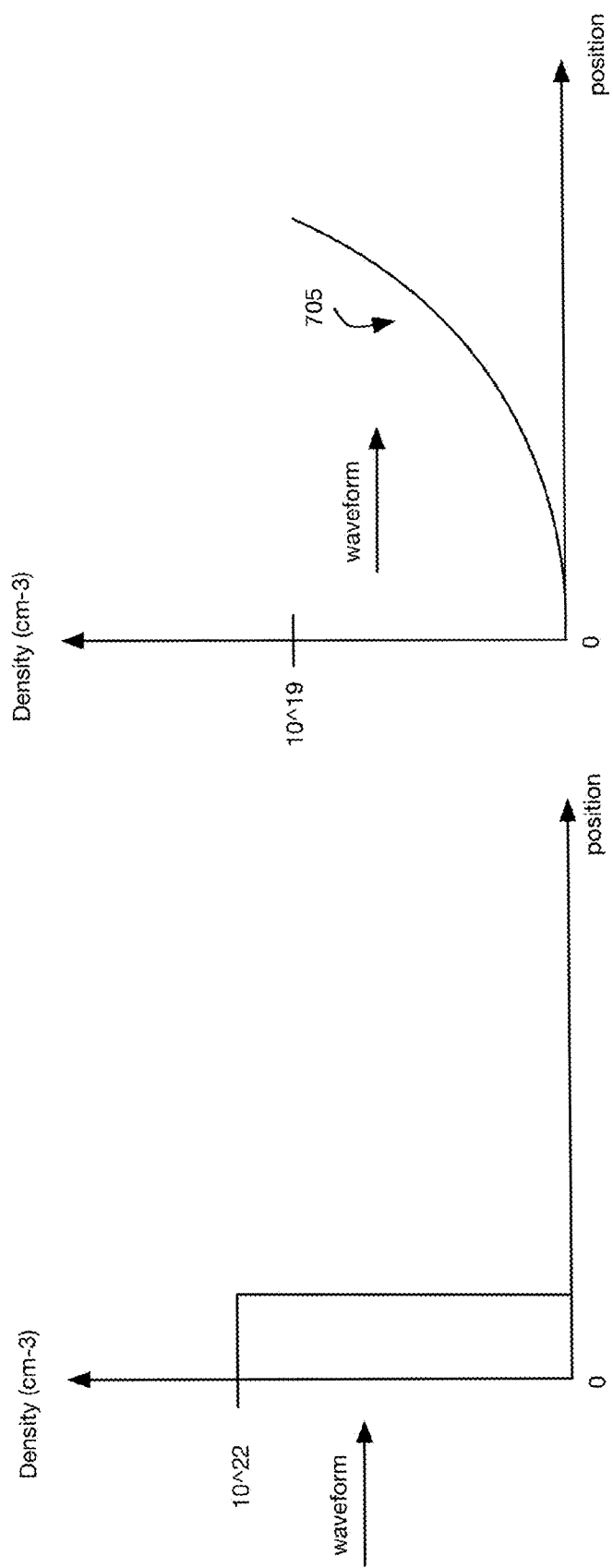

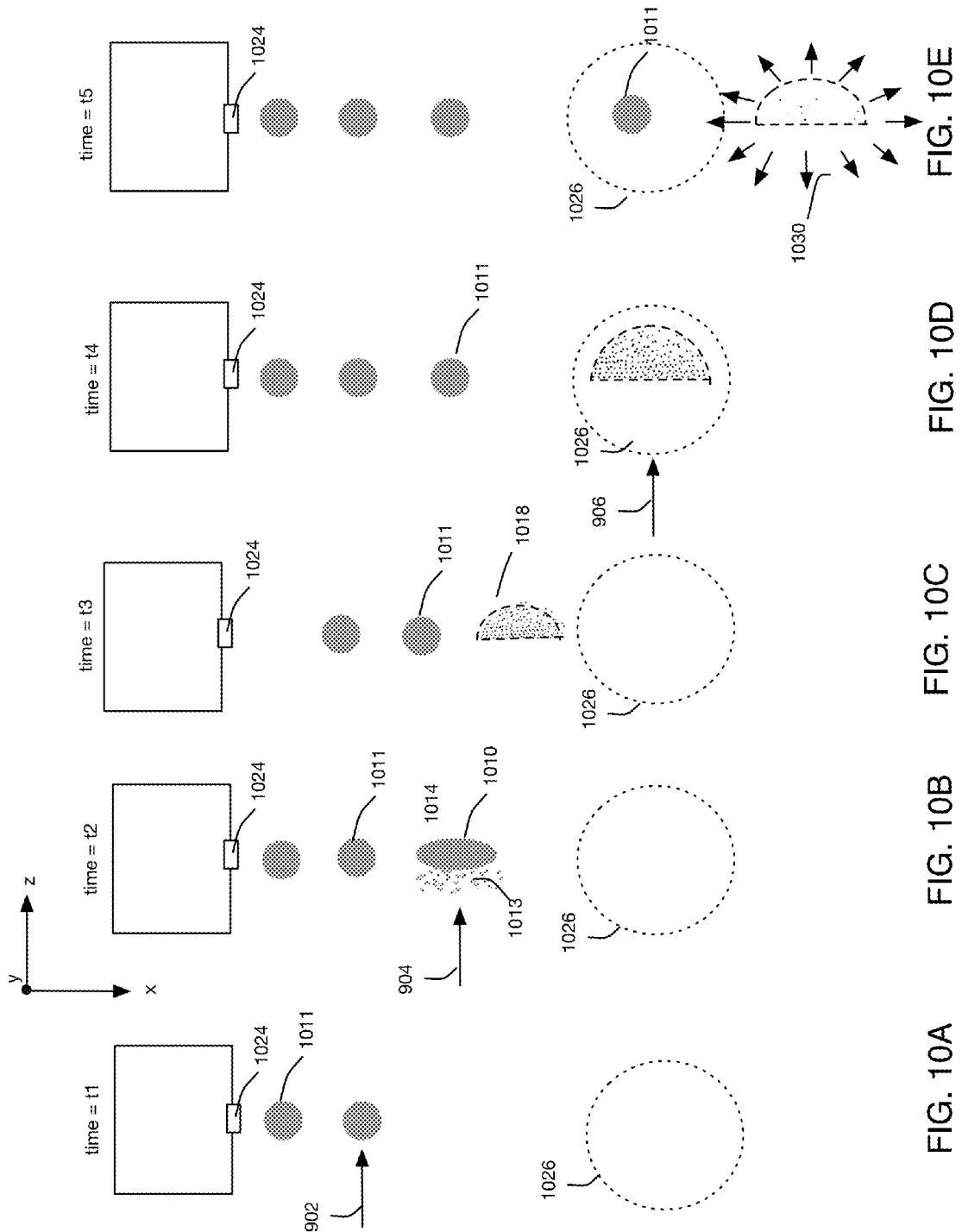

TARGET FOR EXTREME ULTRAVIOLET LIGHT SOURCE

CROSS-REFERENCE TO RELATED APPLICATION

This application is a continuation of U.S. patent application Ser. No. 14/310,972, filed Jun. 20, 2014, now allowed, which is a continuation of U.S. patent application Ser. No. 13/830,380, filed Mar. 14, 2013, now granted as U.S. Pat. No. 8,791,440, issued on Jul. 29, 2014, each of which is titled TARGET FOR EXTREME ULTRAVIOLET LIGHT SOURCE, and each of which is incorporated herein by reference in its entirety.

TECHNICAL FIELD

The disclosed subject matter relates to a target for an extreme ultraviolet (EUV) light source.

BACKGROUND

Extreme ultraviolet (EUV) light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range into a plasma state. In one such method, often termed laser produced plasma (LPP), the plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In one general aspect, a method includes releasing an initial target material toward a target location, the target material including a material that emits extreme ultraviolet (EUV) light when converted to plasma; directing a first amplified light beam toward the initial target material, the first amplified light beam having an energy sufficient to form a collection of pieces of target material from the initial target material, each of the pieces being smaller than the initial target material and being spatially distributed throughout a hemisphere shaped volume; and directing a second amplified light beam toward the collection of pieces to convert the pieces of target material to plasma that emits EUV light.

Implementations can include one or more of the following features.

The EUV light can be emitted from the hemisphere shaped volume in all directions.

The EUV light can be emitted from the hemisphere shaped volume isotropically.

The initial target material can include a metal, and the collection of pieces can include pieces of the metal. The metal can be tin.

The hemisphere shaped volume can define a longitudinal axis along a direction that is parallel to a direction of propagation of the second amplified light beam and a transverse axis along a direction that is transverse to the direction of propagation of the second amplified light beam, and directing the second amplified light beam toward the collection of pieces can include penetrating into the hemisphere shaped volume along the longitudinal axis. The majority of the pieces in the collection of pieces can be converted to plasma.

The first amplified light beam can be a pulse of light having a duration of 150 ps and a wavelength of 1 µm.

The first amplified light beam can be a pulse of light having a duration of less than 150 ps and a wavelength of 1 µm.

The first amplified light beam can include two pulses of light that are temporally separated from each other. The two pulses can include a first pulse of light and a second pulse of light, the first pulse of light having a duration of 1 ns to 10 ns, and the second pulse of light having a duration of less than 1 ns.

The first and second amplified light beams can be beams of pulses.

The first amplified light beam can have an energy that is insufficient to convert the target material to plasma, and the second amplified light beam have an energy that is sufficient to convert the target material to plasma.

A density of the pieces of target material can increase along a direction that is parallel to a direction of propagation of the second amplified light beam.

The pieces of target material in the hemisphere shaped volume can have a diameter of 1-10 µm.

In another general aspect, a target system for an extreme ultraviolet (EUV) light source includes pieces of a target material distributed throughout a hemisphere shaped volume, the target material including a material that emits EUV light when converted to plasma; and a plane surface adjacent to the hemisphere shaped volume and defining a front boundary of the hemisphere shaped volume, the front boundary being positioned to face a source of an amplified light beam. The hemisphere shaped volume faces away from the source of the amplified light beam.

Implementations can include one or more of the following features. The hemisphere shaped volume can have a cross-sectional diameter in a direction that is transverse to a direction of propagation of the amplified light beam, and a maximum of the cross-sectional diameter can be at the plane surface.

A density of the pieces of the target material in the hemisphere shaped volume can increase along a direction that is parallel to a direction of propagation of the amplified light beam.

At least some of the pieces can be individual pieces that are physically separated from each other.

The hemisphere shaped volume can be irradiated with an amplified light beam having sufficient energy to convert the individual pieces of the target material to plasma, and the hemisphere shaped target can emit EUV light in all directions.

The target material droplet can be part of a stream of target material droplets that are released from a nozzle, and the target system also can include a second target material droplet that is separate from the target material droplet and released from the nozzle after the target material droplet. The target system also can include the nozzle.

The source of the amplified light beam can be an opening in a chamber that receives the target material droplet.

In another general aspect, an extreme ultraviolet (EUV) light source includes a first source that produces a pulse of light; a second source that produces an amplified light beam; a target material delivery system; a chamber coupled to the target material delivery system; and a steering system that steers the amplified light beam toward a target location in the chamber that receives a target material droplet from the target material delivery system, the target material droplet including a material that emits EUV light after being converted to plasma. The target material droplet forms a target when struck by the pulse of light, the target including a hemisphere shaped volume having pieces of the target material throughout the volume, and a plane surface positioned between the hemisphere shaped volume and the second source.

Implementations can include the following feature. The pulse of light can be 150 ps or less in duration.

Implementations of any of the techniques described above may include a method, a process, a target, an assembly for generating a hemisphere shaped target, a device for generating a hemisphere shaped target, a kit or pre-assembled system for retrofitting an existing EUV light source, or an apparatus. The details of one or more implementations are set forth in the accompanying drawings and the description below. Other features will be apparent from the description and drawings, and from the claims.

DRAWING DESCRIPTION

FIG. 1A is a perspective view of an exemplary hemisphere shaped target for an EUV light source.

FIG. 3D is a partial side perspective view of the EUV light source of FIG. 3A.

FIG. 3E is a cross-sectional plan view of the EUV light source of FIG. 3D taken along the line 3E-3E.

FIGS. 6A-6D are side views of a target material droplet transforming into a hemisphere shaped target through interactions with the waveform of FIG. 5.

FIGS. 7A and 7B are plots of exemplary density profiles as a function of spatial location.

FIGS. 10A-10E are side views of a target material droplet transforming into a hemisphere shaped target through interactions with the waveform of FIG. 9.

DESCRIPTION

Referring to FIG. 1A, a perspective view of an exemplary target 5 is shown. The hemisphere shape and gently sloped density profile of the target 5 enables the target 5 to provide additional EUV light, increased conversion efficiency, and EUV light that is radially emitted outward from the target in all directions. The hemisphere shape can be a half of a sphere or any other portion of a sphere. However, the hemisphere shape can take other forms. For example, the hemisphere shape can be a partial oblate or prolate spheroid.

The target 5 can be used in a laser produced plasma (LPP) extreme ultraviolet (EUV) light source. The target 5 includes a target material that emits EUV light when in a plasma state. The target material can be a target mixture that includes a target substance and impurities such as non-target particles. The target substance is the substance that is converted to a plasma state that has an emission line in the EUV range. The target substance can be, for example, a droplet of liquid or molten metal, a portion of a liquid stream, solid particles or clusters, solid particles contained within liquid droplets, a foam of target material, or solid particles contained within a portion of a liquid stream. The target substance, can be, for example, water, tin, lithium, xenon, or any material that, when converted to a plasma state, has an emission line in the EUV range. For example, the target substance can be the element tin, which can be used as pure tin (Sn); as a tin compound, for example, $SnBr_4$, $SnBr_2$, $SnH_4$, as a tin alloy, for example, tin-gallium alloys, tin-indium alloys, tin-indium-gallium alloys, or any combination of these alloys. Moreover, in the situation in which there are no impurities, the target material includes only the target substance. The discussion below provides examples in which the target material is a target material droplet made of molten metal. In these examples, the target material is referred to as the target material droplet. However, the target material can take other forms.

Figure 1C:
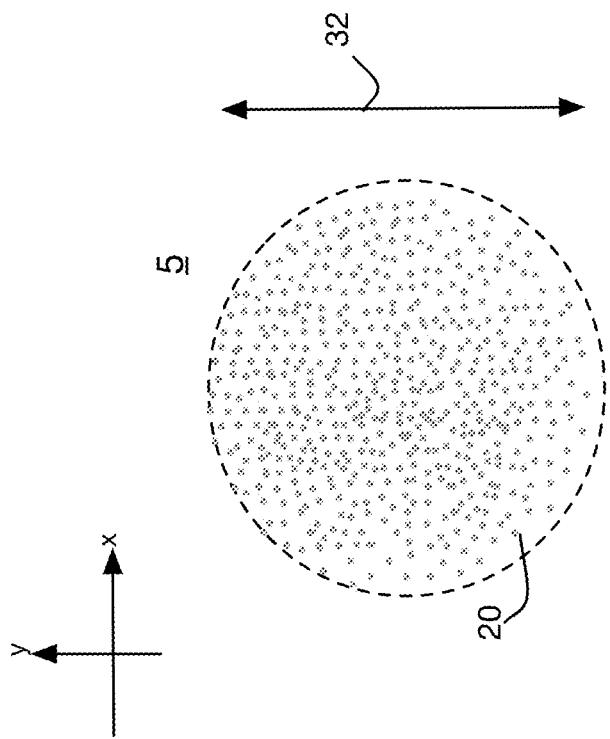
FIG. 1C is a front cross-sectional view of the exemplary hemisphere shaped target of FIG. 1A along the line 1C-1C.
Figure 1B:
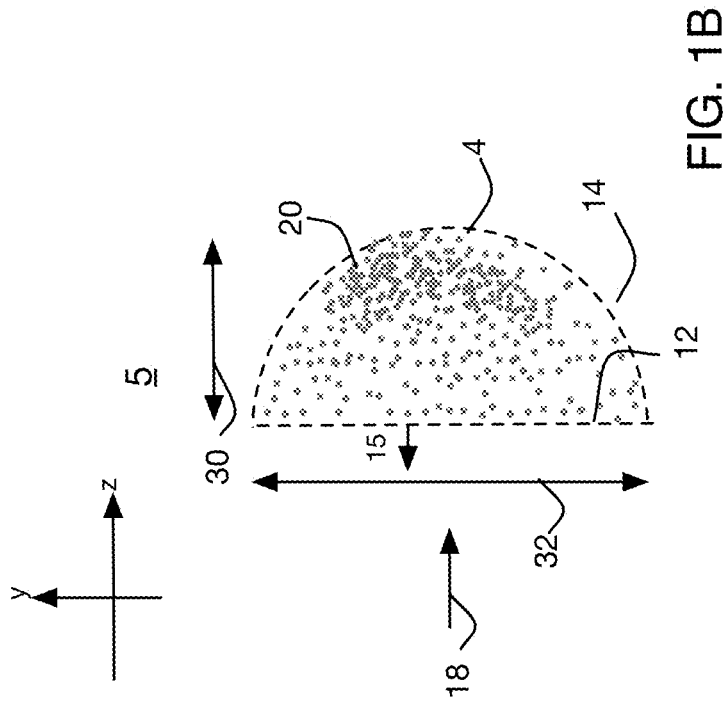
FIG. 1B is a side view of the exemplary hemisphere shaped target of FIG. 1A.

Irradiating the target material with an amplified light beam of sufficient energy (a "main pulse" or a "main beam") converts the target material to plasma, thereby causing the target 5 to emit EUV light. FIG. 1B is a side view of the target 5. FIG. 1C is a front cross-sectional view of the target 5 along the line 1C-1C of FIG. 1A.

The target 5 is a collection of pieces of target material 20 distributed in a hemisphere shaped volume 10. The target 5 is formed by striking a target material with one or more pulses of radiation (a "pre-pulse") that precede (in time) the main pulse to transform the target material into a collection of pieces of target material. The pre-pulse is incident on a surface of the target material and the interaction between the initial leading edge of the pre-pulse and the target material can produce a plasma (that does not necessarily emit EUV light) at the surface of the target material. The pre-pulse continues to be incident on the created plasma and is absorbed by the plasma over a period that is similar to the temporal duration of the pre-pulse, about 150 picoseconds (ps). The created plasma expands as time passes. An interaction between the expanding plasma and the remaining portion of the target material can generate a shock wave that can act on the target material non-uniformly, with the center of the target material receiving the brunt of the shock wave. The shock wave can cause the center part of the target material to break into particles that expand in three dimensions. However, because the center part also experiences force in an opposite direction from the expanding plasma, a hemisphere of particles can be formed instead of a sphere.

The pieces of target material 20 in the collection can be non-ionized pieces or segments of target material. That is, the pieces of target material 20 are not in a plasma state when the main pulse strikes the target 5. The pieces or segments of target material 20 can be, for example, a mist of nano- or micro-particles, separate pieces or segments of molten metal, or a cloud of atomic vapor. The pieces of target material 20 are bits of material that are distributed in a hemisphere shaped volume, but the pieces of target material 20 are not formed as a single piece that fills the hemisphere shaped volume. There can be voids between the pieces of target material 20. The pieces of target material 20 can also include non-target material, such as impurities, that are not converted to EUV light emitting plasma. The pieces of target material 20 are referred to as the particles 20. Individual particles 20 can be 1-10 µm in diameter. The particles 20 can be separated from each other. Some or all of the particles 20 can have physical contact with another particle.

The hemisphere shaped volume 10 has a plane surface 12 that defines a front boundary of the hemisphere shaped volume 10, and a hemisphere shaped portion 14 that extends away from the plane surface in a direction "z." When used in a EUV light source, a normal 15 of the plane surface 12 faces an oncoming amplified light beam 18 that propagates in the "z" direction. The plane surface 12 can be transverse to direction of propagation of the oncoming amplified light beam 18, as shown in FIGS. 1A and 1B, or the plane surface 12 can be angled relative to the oncoming beam 18.

Figure 1D:
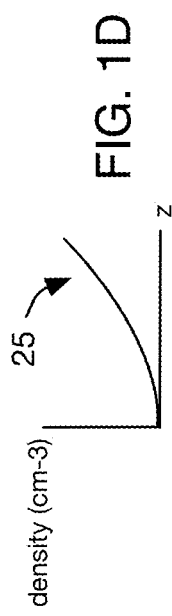
FIG. 1D is a plot of an exemplary density as a function of location within the hemisphere shaped target of FIG. 1A.

Referring also to FIG. 1D, the particles 20 are distributed in the hemisphere shaped volume 10 with an exemplary density gradient 25 that has a minimum at the plane surface 12 of the target 5. The density gradient 25 is a measure of the density of particles in a unit volume as a function of position within the hemisphere shaped volume 10. The density gradient 25 increases within the target 5 in the direction of propagation ("z") of the main pulse, and the maximum density is on a side of the target 5 opposite from the side of the plane surface 12. The placement of the minimum density at the plane surface 12 and the gradual increase in the density of the particles 20 results in more of the main pulse being absorbed by the target 5, thereby producing more EUV light and providing a higher conversion efficiency (CE) for a light source that uses the target 5. In effect, this means that enough energy is provided to the target 5 by the main pulse to ionize the target 5 efficiently to produce ionized gas. Having the minimum density at or near the plane surface 12 can increase the absorption of main beam by the target 5 in at least two ways.

First, the minimum density of the target 5 is lower than the density of a target that is a continuous piece of target material (such as a target material droplet made of molten tin or a disk shaped target of molten tin). Second, the density gradient 25 places the lowest density portions of the target 5 at the plane surface 12, which is the plane where the amplified light beam 18 enters the target 5. Because the density of the particles 20 increases in the "z" direction, most, or all, of the amplified light beam 18 is absorbed by particles 20 that are closer to the plane surface 12 before the beam 18 reaches and is reflected from a region of high density within the target 5. Therefore, compared to a target that has a region of high density closer to the point of impact with the amplified light beam 18, the target 5 absorbs a higher portion of the energy in the amplified light beam 18. The absorbed light beam 18 is used to convert the particles 20 to plasma by ionization. Thus, the density gradient 25 also enables more EUV light to be generated.

Second, the target 5 presents a larger area or volume of particles to the main pulse, enabling increased interaction between the particles 20 and the main pulse. Referring to FIGS. 1B and 1C, the target 5 defines a length 30 and a cross-section width 32. The length 30 is the distance in the "z" direction along which the hemisphere portion 14 extends. The length 30 is longer than a similar length in a target that is a continuous piece of target material because the hemisphere shaped volume 10 has a longer extent in the "z" direction. A continuous piece of target material is one that has a uniform, or nearly uniform, density in the direction of propagation of the amplified light beam 18. Additionally, because of the gradient 25, the amplified light beam 18 propagates further into the target 5 in the "z" direction while reflections are kept low. The relatively longer length 30 provides a longer plasma scale length. The plasma scale length for the target 5 can be, for example, 200 µm, which can be twice the value of the plasma scale length for a disk shaped target made from a continuous piece of target material. A longer plasma scale length allows more of the amplified light beam 18 to be absorbed by the target 5.

The cross-section width 32 is the width of the plane surface 12 of the target 5. The cross-section interaction width 32 can be, for example, about 200 µm, when the target 5 is generated with a pre-pulse that occurs 1000 ns prior to the main pulse, and the pre-pulse has a duration of 150 ps and a wavelength of 1 µm. The cross-section interaction width 32 can be about 300 µm when the target 5 is generated with a 50 ns duration $CO_2$ laser pulse. A pulse of light or radiation has a temporal duration for an amount of time during which a single pulse has an intensity of 50% or more of the maximum intensity of the pulse. This duration can also be referred to as the full width at half maximum (FWHM).

Like the length 30, the cross-section width 32 is larger than a similar dimension in a target that is made of a continuous, coalesced piece of target material (such as a target material droplet made of coalesced molten metal). Because both the interaction length 30 and the interaction width 32 are relatively larger than other targets, the target 5 also has a larger EUV light emitting volume. The light emitting volume is the volume in which the particles 20 are distributed and can be irradiated by the amplified light beam 18. For example, the target 5 can have a light emitting volume that is twice that of a disk shaped target of molten metal. The larger light emitting volume of the target 5 results in generation of greater amounts of EUV light and a higher conversion efficiency (CE) because a higher portion of the target material (the particles 20) in the target 5 is presented to and irradiated by the amplified light beam 18 and subsequently converted to plasma.

Further, the target 5 does not have a wall or high density region at a back side 4 that could prevent EUV light from being emitted in the direction of propagation of the main pulse. Thus, the target 5 emits EUV light radially outward in all directions, allowing more EUV light to be collected and further increasing the collection efficiency. Moreover, radially isotropic EUV light or substantially isotropic EUV light can provide improved performance for a lithography tool (not shown) that uses the EUV light emitted from the target 5 by reducing the amount of calibration needed for the tool. For example, if uncorrected, unexpected spatial variations in EUV intensity can cause overexposure to a wafer imaged by the lithography tool. The target 5 can minimize such calibration concerns by emitting EUV light uniformly in all directions. Moreover, because the EUV light is radially uniform, errors in alignment and fluctuations in alignment within the lithography tool or upstream from the lithography tool do not also cause variations in intensity.

FIGS. 2A, 2B, and 3A-3C show exemplary LPP EUV light sources in which the target 5 can be used.

Figure 2A:
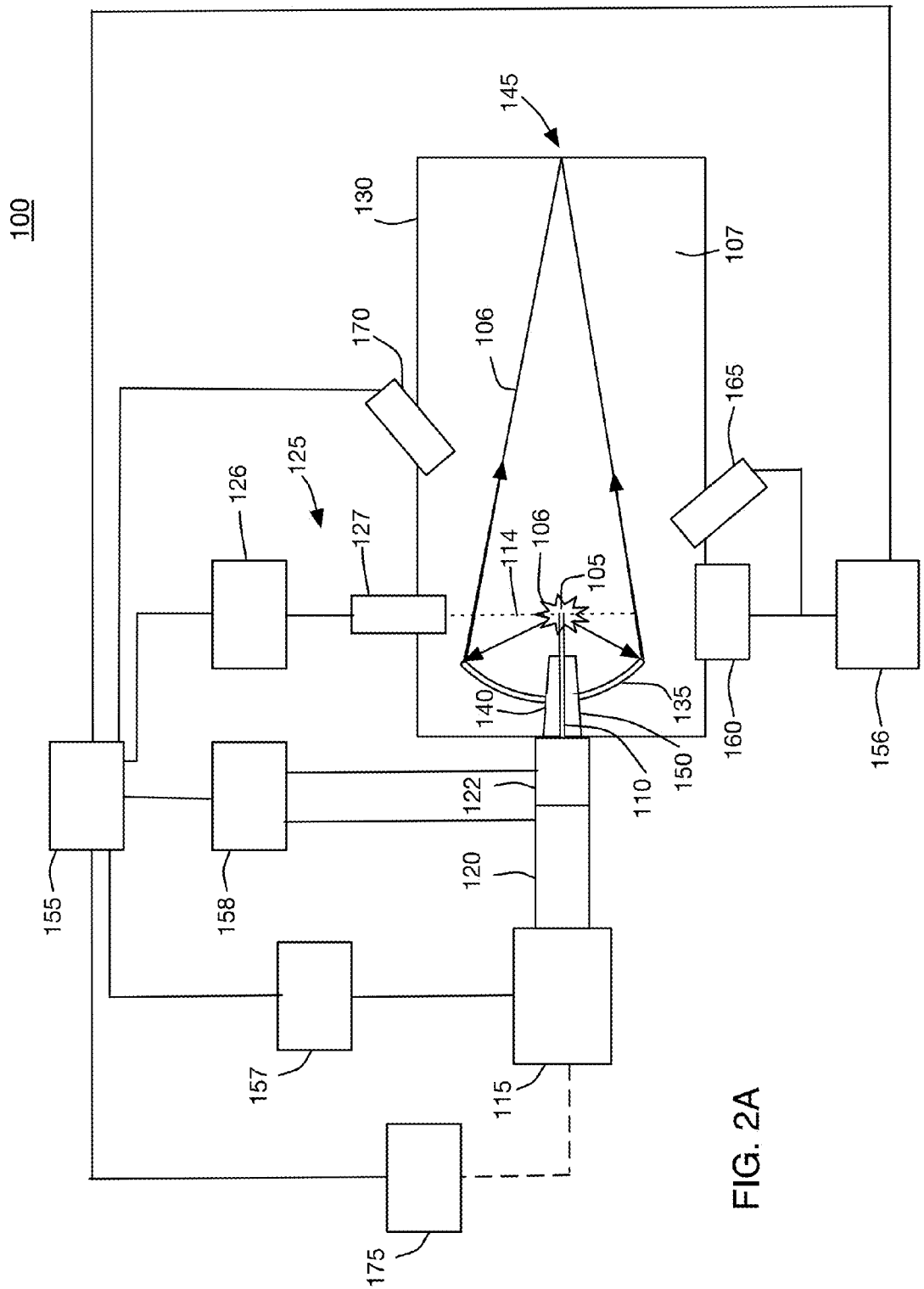
FIG. 2A is a block diagram of an exemplary laser produced plasma extreme ultraviolet light source.

Referring to FIG. 2A, an LPP EUV light source 100 is formed by irradiating a target mixture 114 at a target location 105 with an amplified light beam 110 that travels along a beam path toward the target mixture 114. The target location 105, which is also referred to as the irradiation site, is within an interior 107 of a vacuum chamber 130. When the amplified light beam 110 strikes the target mixture 114, a target material within the target mixture 114 is converted into a plasma state that has an element with an emission line in the EUV range to produce EUV light 106. The created plasma has certain characteristics that depend on the composition of the target material within the target mixture 114. These characteristics can include the wavelength of the EUV light produced by the plasma and the type and amount of debris released from the plasma.

The light source 100 also includes a target material delivery system 125 that delivers, controls, and directs the target mixture 114 in the form of liquid droplets, a liquid stream, solid particles or clusters, solid particles contained within liquid droplets or solid particles contained within a liquid stream. The target mixture 114 can also include impurities such as non-target particles. The target mixture 114 is delivered by the target material delivery system 125 into the interior 107 of the chamber 130 and to the target location 105.

The light source 100 includes a drive laser system 15 that produces the amplified light beam 110 due to a population inversion within the gain medium or mediums of the laser system 115. The light source 100 includes a beam delivery system between the laser system 115 and the target location 105, the beam delivery system including a beam transport system 120 and a focus assembly 122. The beam transport system 120 receives the amplified light beam 110 from the laser system 115, and steers and modifies the amplified light beam 110 as needed and outputs the amplified light beam 110 to the focus assembly 122. The focus assembly 122 receives the amplified light beam 110 and focuses the beam 110 to the target location 105.

In some implementations, the laser system 115 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 115 produces an amplified light beam 110 due to the population inversion in the gain media of the laser amplifiers even if there is no laser cavity. Moreover, the laser system 115 can produce an amplified light beam 110 that is a coherent laser beam if there is a laser cavity to provide enough feedback to the laser system 115. The term "amplified light beam" encompasses one or more of: light from the laser system 115 that is merely amplified but not necessarily a coherent laser oscillation and light from the laser system 115 that is amplified (externally or within a gain medium in the oscillator) and is also a coherent laser oscillation.

The optical amplifiers in the laser system 115 can include as a gain medium a filling gas that includes $CO_2$ and can amplify light at a wavelength of between about 9100 and about 11000 nm, and in particular, at about 10.6 µm, at a gain greater than or equal to 1000. In some examples, the optical amplifiers amplify light at a wavelength of 10.59 µm. Suitable amplifiers and lasers for use in the laser system 115 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the laser system 115 can also include a cooling system such as water that can be used when operating the laser system 115 at higher powers.

Figure 2B:
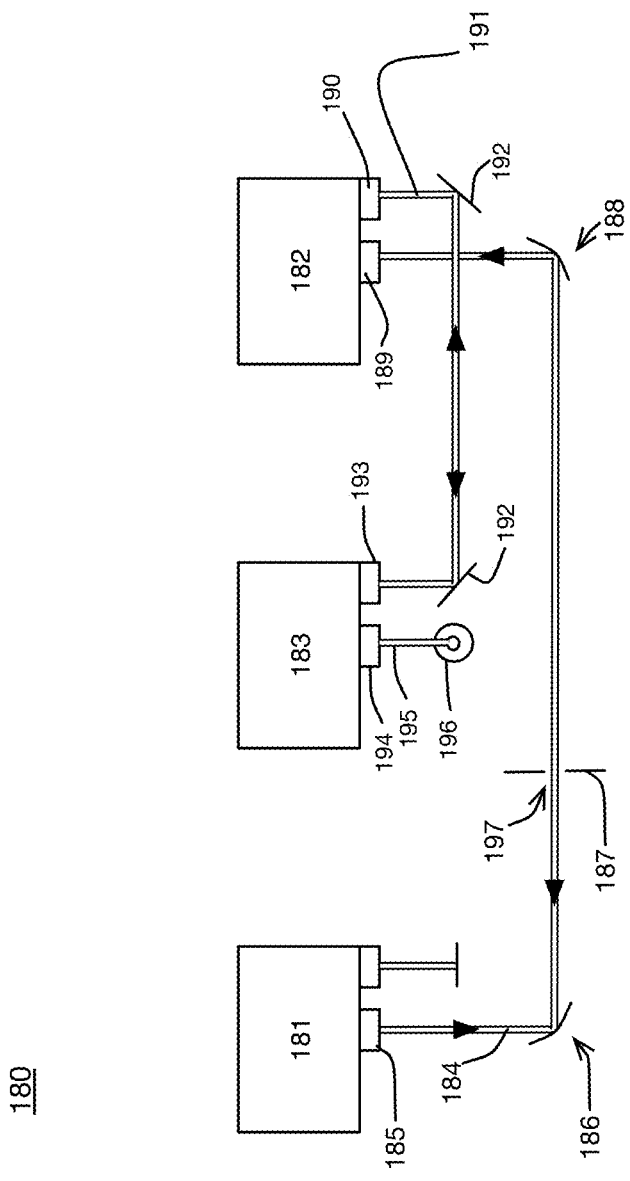
FIG. 2B is a block diagram of an example of a drive laser system that can be used in the light source of FIG. 2A.

FIG. 2B shows a block diagram of an example drive laser system 180. The drive laser system 180 can be used as the drive laser system 115 in the source 100. The drive laser system 180 includes three power amplifiers 181, 182, and 183. Any or all of the power amplifiers 181, 182, and 183 can include internal optical elements (not shown). The power amplifiers 181, 182, and 183 each include a gain medium in which amplification occurs when pumped with an external electrical or optical source.

Light 184 exits from the power amplifier 181 through an output window 185 and is reflected off a curved mirror 186. After reflection, the light 184 passes through a spatial filter 187, is reflected off of a curved mirror 188, and enters the power amplifier 182 through an input window 189. The light 184 is amplified in the power amplifier 182 and redirected out of the power amplifier 182 through an output window 190 as light 191. The light 191 is directed toward the amplifier 183 with fold mirrors 192 and enters the amplifier 183 through an input window 193. The amplifier 183 amplifies the light 191 and directs the light 191 out of the amplifier 183 through an output window 194 as an output beam 195. A fold mirror 196 directs the output beam 195 upwards (out of the page) and toward the beam transport system 120.

The spatial filter 187 defines an aperture 197, which can be, for example, a circular opening through which the light 184 passes. The curved mirrors 186 and 188 can be, for example, off-axis parabola mirrors with focal lengths of about 1.7 m and 2.3 m, respectively. The spatial filter 187 can be positioned such that the aperture 197 coincides with a focal point of the drive laser system 180. The example of FIG. 2B shows three power amplifiers. However, more or fewer power amplifiers can be used.

Referring again to FIG. 2A, the light source 100 includes a collector mirror 135 having an aperture 140 to allow the amplified light beam 110 to pass through and reach the target location 105. The collector mirror 135 can be, for example, an ellipsoidal mirror that has a primary focus at the target location 105 and a secondary focus at an intermediate location 145 (also called an intermediate focus) where the EUV light can be output from the light source 100 and can be input to, for example, an integrated circuit beam positioning system tool (not shown). The light source 100 can also include an open-ended, hollow conical shroud 150 (for example, a gas cone) that tapers toward the target location 105 from the collector mirror 135 to reduce the amount of plasma-generated debris that enters the focus assembly 122 and/or the beam transport system 120 while allowing the amplified light beam 110 to reach the target location 105. For this purpose, a gas flow can be provided in the shroud that is directed toward the target location 105.

The light source 100 can also include a master controller 155 that is connected to a droplet position detection feedback system 156, a laser control system 157, and a beam control system 158. The light source 100 can include one or more target or droplet imagers 160 that provide an output indicative of the position of a droplet, for example, relative to the target location 105 and provide this output to the droplet position detection feedback system 156, which can, for example, compute a droplet position and trajectory from which a droplet position error can be computed either on a droplet by droplet basis or on average. The droplet position detection feedback system 156 thus provides the droplet position error as an input to the master controller 155. The master controller 155 can therefore provide a laser position, direction, and timing correction signal, for example, to the laser control system 157 that can be used, for example, to control the laser timing circuit and/or to the beam control system 158 to control an amplified light beam position and shaping of the beam transport system 120 to change the location and/or focal power of the beam focal spot within the chamber 130.

The target material delivery system 125 includes a target material delivery control system 126 that is operable in response to a signal from the master controller 155, for example, to modify the release point of the droplets as released by a target material supply apparatus 127 to correct for errors in the droplets arriving at the desired target location 105.

Additionally, the light source 100 can include a light source detector 165 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 165 generates a feedback signal for use by the master controller 155. The feedback signal can be, for example, indicative of the errors in parameters such as the timing and focus of the laser pulses to properly intercept the droplets in the right place and time for effective and efficient EUV light production.

The light source 100 can also include a guide laser 175 that can be used to align various sections of the light source 100 or to assist in steering the amplified light beam 110 to the target location 105. In connection with the guide laser 175, the light source 100 includes a metrology system 124 that is placed within the focus assembly 122 to sample a portion of light from the guide laser 175 and the amplified light beam 110. In other implementations, the metrology system 124 is placed within the beam transport system 120. The metrology system 124 can include an optical element that samples or re-directs a subset of the light, such optical element being made out of any material that can withstand the powers of the guide laser beam and the amplified light beam 110. A beam analysis system is formed from the metrology system 124 and the master controller 155 since the master controller 155 analyzes the sampled light from the guide laser 175 and uses this information to adjust components within the focus assembly 122 through the beam control system 158.

Thus, in summary, the light source 100 produces an amplified light beam 110 that is directed along the beam path to irradiate the target mixture 114 at the target location 105 to convert the target material within the mixture 114 into plasma that emits light in the EUV range. The amplified light beam 110 operates at a particular wavelength (that is also referred to as a source wavelength) that is determined based on the design and properties of the laser system 115. Additionally, the amplified light beam 110 can be a laser beam when the target material provides enough feedback back into the laser system 115 to produce coherent laser light or if the drive laser system 115 includes suitable optical feedback to form a laser cavity.

Figure 3A:
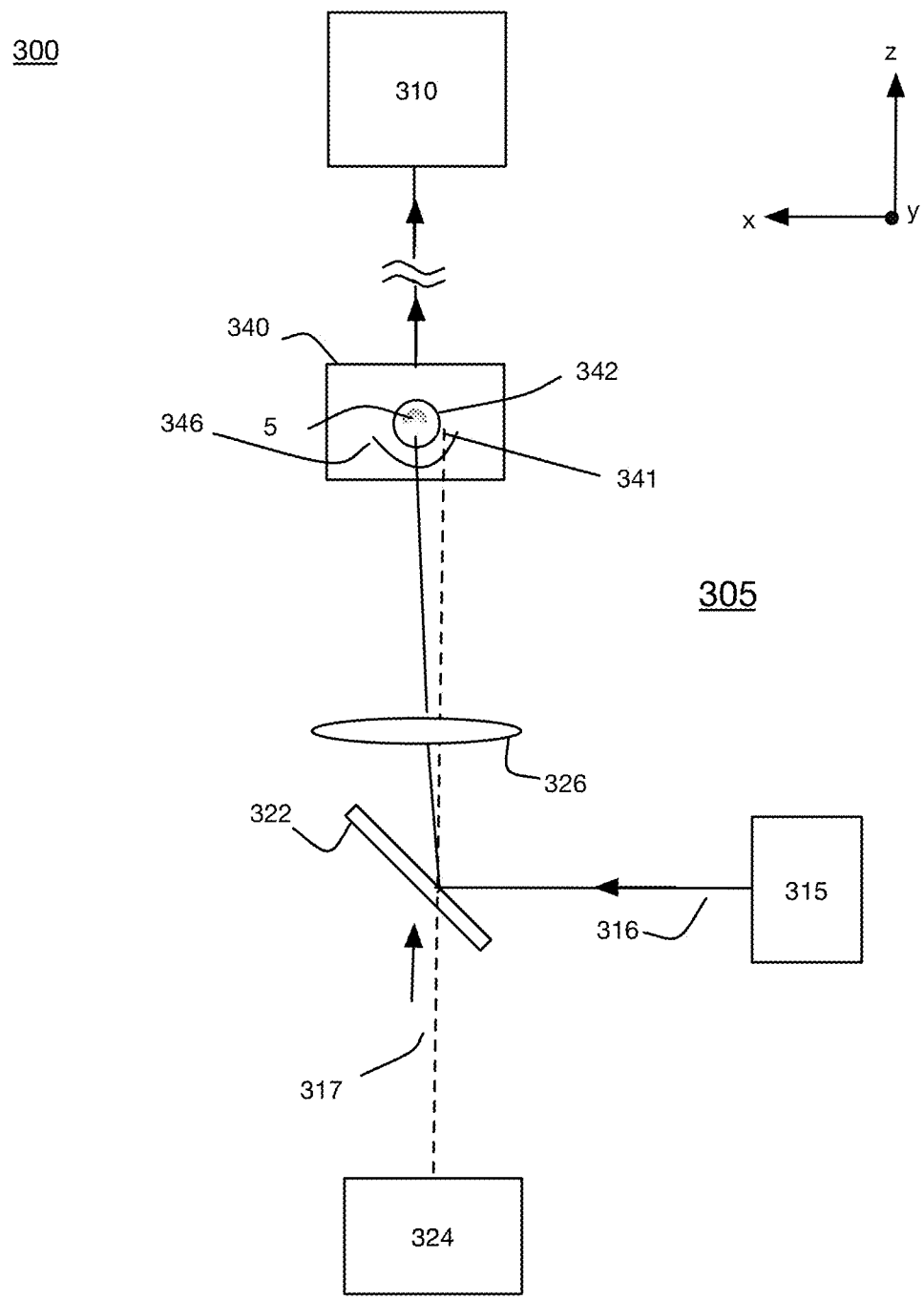
FIG. 3A is a top plan view of another laser produced plasma extreme ultraviolet (EUV) light source and a lithography tool coupled to the EUV light source.

Referring to FIG. 3A, a top plan view of an exemplary optical imaging system 300 is shown. The optical imaging system 300 includes an LPP EUV light source 305 that provides EUV light to a lithography tool 310. The light source 305 can be similar to, and/or include some or all of the components of, the light source 100 of FIGS. 2A and 2B. As discussed below, the target 5 can be used in the light source 305 to increase the amount of light emitted by the light source 305.

The light source 305 includes a drive laser system 315, an optical element 322, a pre-pulse source 324, a focusing assembly 326, a vacuum chamber 340, and an EUV collecting optic 346. The EUV collecting optic 346 directs the EUV light emitted by converting the target 5 to plasma to the lithography tool 310. The EUV collection optic 346 can be the mirror 135 (FIG. 2A).

Referring also to FIGS. 3B-3E, the light source 305 also includes a target material delivery apparatus 347 that produces a stream of target material 348. The stream of target material 348 can include target material in any form, such as liquid droplets, a liquid stream, solid particles or clusters, solid particles contained within liquid droplets or solid particles contained within a liquid stream. In the discussion below, the target material stream 348 includes target material droplets 348. In other examples, the target material stream can include target material of other forms.

The target material droplets travel along the "x" direction from the target material delivery apparatus 347 to a target location 342 in the vacuum chamber 340. The drive laser system 315 produces an amplified light beam 316. The amplified light beam 316 can be similar to the amplified light beam 18 of FIGS. 1A-1C, or the amplified light beam 110 of FIGS. 2A and 2B, and can be referred to as a main pulse or a main beam. The amplified light beam 316 has an energy sufficient to convert the particles 20 in the target 5 into plasma that emits EUV light.

In some implementations, the drive laser system 315 can be a dual-stage master oscillator and power amplifier (MOPA) system that uses carbon dioxide ($CO_2$) amplifiers within the master oscillator and power amplifier, and the amplified light beam 316 can be a 130 ns duration, 10.6 µm wavelength $CO_2$ laser light pulse generated by the MOPA. In other implementations, the amplified light beam 316 can be a $CO_2$ laser light pulse that has a duration of less than 50 ns.

The pre-pulse source 324 emits a pulse of radiation 317. The pre-pulse source 324 can be, for example, a Q-switched Nd:YAG laser, and the pulse of radiation 317 can be a pulse from the Nd:YAG laser. The pulse of radiation 317 can have a duration of 10 ns and a wavelength of 1.06 µm, for example.

In the example shown in FIG. 3A, the drive laser system 315 and the pre-pulse source 324 are separate sources. In other implementations, they can be a part of the same source. For example, both the pulse of radiation 317 and the amplified light beam 316 can be generated by the drive laser system 315. In such an implementation, the drive laser system 315 can include two $CO_2$ seed laser subsystems and one amplifier. One of the seed laser subsystems can produce an amplified light beam having a wavelength of 10.26 µm, and the other seed laser subsystem can produce an amplified light beam having a wavelength of 10.59 µm. These two wavelengths can come from different lines of the $CO_2$ laser. Both amplified light beams from the two seed laser subsystems are amplified in the same power amplifier chain and then angularly dispersed to reach different locations within the chamber 340. In one example, the amplified light beam with the wavelength of 10.26 µm is used as the pre-pulse 317, and the amplified light beam with the wavelength of 10.59 µm is used as the amplified light beam 316. In other examples, other lines of the $CO_2$ laser, which can generate different wavelengths, can be used to generate the two amplified light beams (one of which is the pulse of radiation 317 and the other of which is the amplified light beam 316).

Referring again to FIG. 3A, the optical element 322 directs the amplified light beam 316 and the pulse of radiation 317 from the pre-pulse source 324 to the chamber 340. The optical element 322 is any element that can direct the amplified light beam 316 and the pulse of radiation 317 along similar paths and deliver the amplified light beam 316 and the pulse of radiation 317 to the chamber 340. In the example shown in FIG. 3A, the optical element 322 is a dichroic beamsplitter that receives the amplified light beam 316 and reflects it toward the chamber 340. The optical element 322 receives the pulse of radiation 317 and transmits the pulses toward the chamber 340. The dichroic beamsplitter has a coating that reflects the wavelength(s) of the amplified light beam 316 and transmits the wavelength(s) of the pulse of radiation 317. The dichroic beamsplitter can be made of, for example, diamond.

In other implementations, the optical element 322 is a mirror that defines an aperture (not shown). In this implementation, the amplified light beam 316 is reflected from the mirror surface and directed toward the chamber 340, and the pulses of radiation pass through the aperture and propagate toward the chamber 340.

In still other implementations, a wedge-shaped optic (for example, a prism) can be used to separate the main pulse 316, the pre-pulse 317, and the pre-pulse 318 into different angles, according to their wavelengths. The wedge-shaped optic can be used in addition to the optical element 322, or it can be used as the optical element 322. The wedge-shaped optic can be positioned just upstream (in the "−z" direction) of the focusing assembly 326.

Additionally, the pulse of radiation 317 can be delivered to the chamber 340 in other ways. For example, the pulse 317 can travel through optical fibers that deliver the pulses 317 and 318 to the chamber 340 and/or the focusing assembly 326 without the use of the optical element 322 or other directing elements. In these implementations, the fiber can bring the pulse of radiation 317 directly to an interior of the chamber 340 through an opening formed in a wall of the chamber 340.

Regardless of how the amplified light beam 316 and the pulses of radiation 317 and 318 are directed toward the chamber 340, the amplified light beam 316 is directed to a target location 342 in the chamber 340. The pulse of radiation 317 is directed to a location 341. The location 341 is displaced from the target location 342 in the "−x" direction.

The amplified light beam 316 from the drive laser system 315 is reflected by the optical element 322 and propagates through the focusing assembly 326. The focusing assembly 326 focuses the amplified light beam 316 onto the target location 342. The pulse of radiation 317 from the pre-pulse source 324 passes through the optical element 322 and through the focusing assembly 216 to the chamber 340. The pulse of radiation 317 propagates to the location 341 in the chamber 340 that is in the "−x" direction relative to the target location 342. The displacement between the location 342 and the location 341 allows the pulse of radiation 317 to irradiate a target material droplet to convert the droplet to the hemisphere shaped target 5 before the target 5 reaches the target location 342 without substantially ionizing the target 5. In this manner, the hemisphere shaped target 5 can be a pre-formed target that is formed at a time before the target 5 enters the target location 342.

Figure 3B:
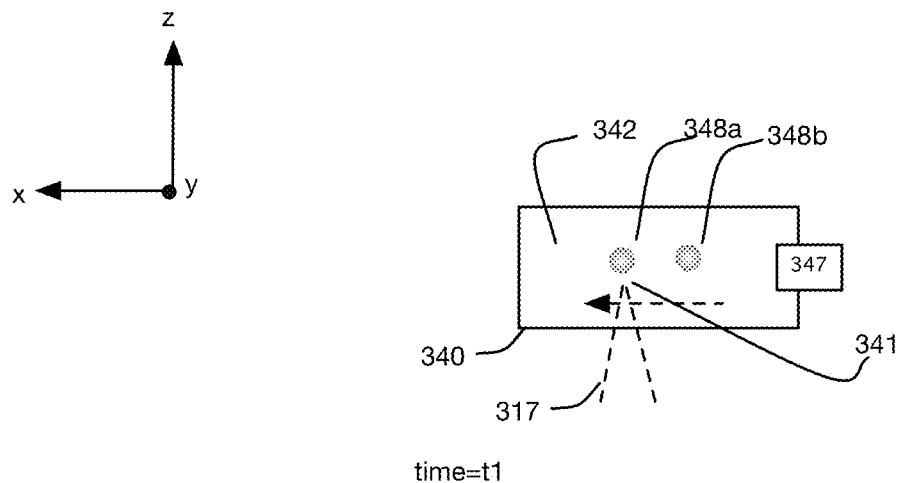
FIGS. 3B and 3C are top views of a vacuum chamber of the EUV light source of FIG. 3A at two different times.
Figure 3C:
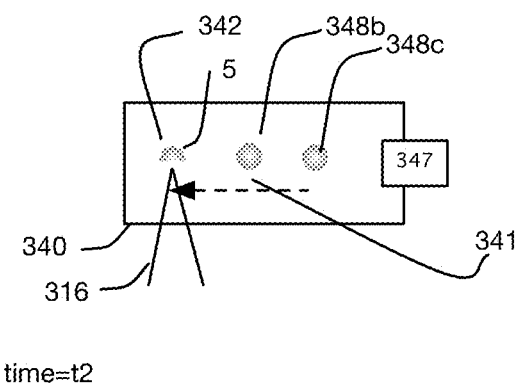

In greater detail and referring also to FIGS. 3B and 3C, the target location 342 is a location inside of the chamber 340 that receives the amplified light beam 316 and a droplet in the stream of target material droplets 348. The target location 342 is also a location that is positioned to maximize an amount of EUV light delivered to the EUV collecting optic 346. For example, the target location 342 can be at a focal point of the EUV collecting optic 346. FIGS. 3B and 3C show top views of the chamber 340 at times $t_1$ and $t_2$, respectively, with time=$t_1$ occurring before time=$t_2$. In the example shown in FIGS. 3B and 3C, the amplified light beam 316 and the pulsed beam of radiation 317 occur at different times and are directed toward different locations within the chamber 340.

The stream 348 travels in the "x" direction from the target material supply apparatus 347 to the target location 342. The stream of target material droplets 348 includes the target material droplets 348a, 348b, and 348c. At a time=$t_1$ (FIG. 3B), the target material droplets 348a and 348b travel in the "x" direction from the target material supply apparatus 347 to the target location 342. The pulsed beam of radiation 317 irradiates the target material droplet 348a at the time "$t_1$" at the location 341, which is displaced in the "−x" direction from the target location 342. The pulsed beam of radiation 317 transforms the target material droplet 348b into the hemisphere target 5. At the time=$t_2$ (FIG. 3C), the amplified light beam 316 irradiates the target 5 and converts the particles 20 of target material into EUV light.

Figure 4:
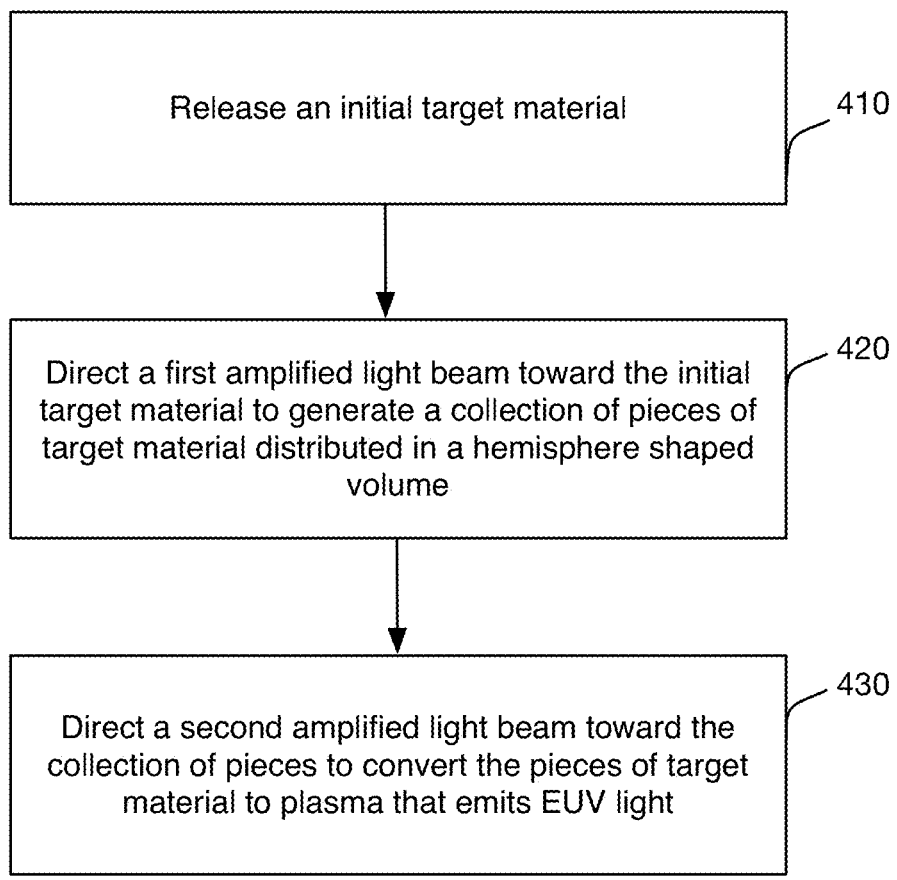
FIG. 4 is a flow chart of an exemplary process for forming a hemisphere shaped target.

Referring to FIG. 4, an exemplary process 400 for generating the hemisphere shaped target 5 is shown. The process 400 can be performed using the target material supply apparatus 127 (FIG. 2A) or the target material supply apparatus 347 (FIGS. 3B-3E).

An initial target material is released toward a target location (410). Referring also to FIGS. 3B and 3C, the target material droplet 348a is released from the target material supply apparatus 347 and travels toward the target location 342. The initial target material is a target material droplet that emerges or is released from the target material supply apparatus 347 as a droplet. The initial target material droplet is a droplet that has not been transformed or altered by a pre-pulse. The initial target material droplet can be a coalesced sphere or substantially spherical piece of molten metal that can be considered as a continuous piece of target material. The target material droplet 348a prior to the time "$t_1$" is an example of an initial target material in this example.

A first amplified light beam is directed toward the initial target material to generate a collection of pieces of target material distributed in a hemisphere shaped volume (420) without substantially ionizing the initial target material. The collection of pieces of target material can be the particles 20 (FIGS. 1A-1C), which are distributed in the hemisphere shaped volume 10. The first amplified light beam can be the pulsed light beam 317 emitted from the source 324 (FIGS. 3A, 3D, and 3E). The first amplified light beam can be referred to as the "pre-pulse." The first amplified light beam is a pulse of light that has an energy and/or pulse duration sufficient to transform the target material droplet 348a from a droplet that is a continuous or coalesced segment or piece of molten target material into the target 5, which is a hemisphere shaped distribution of particles 20.

Figure 9:
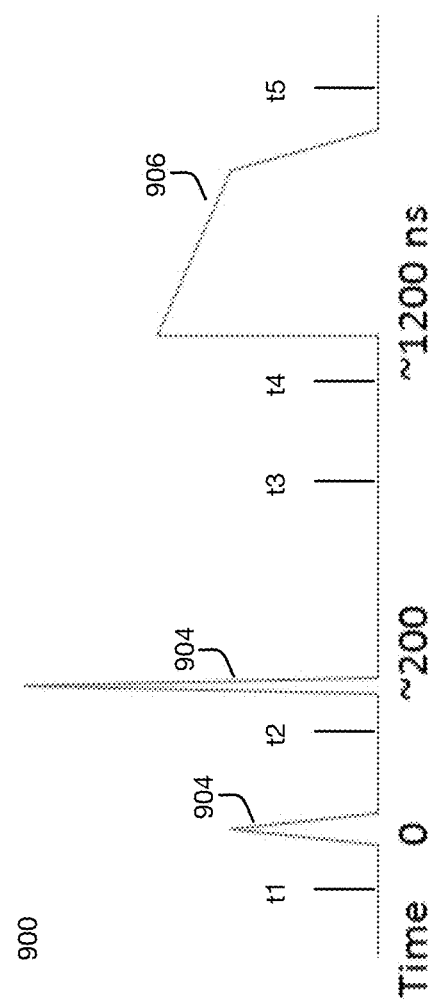
FIG. 9 is a plot of another exemplary waveform for transforming a target material droplet into a hemisphere shaped target.

The first amplified light beam can be, for example, a pulse of light that has a duration of 130 ns and a wavelength of 1 μm. In another example, first amplified light beam can be a pulse of light that has a duration of 150 ps, a wavelength of 1 μm, an energy of 10 milliJoules (mJ), a 60 μm focal spot, and an intensity of $2\times10^{12}$ W/cm$^2$. The energy, wavelength, and/or duration of the first amplified light beam are selected to transform the target material droplet into the hemisphere shaped target 5. In some implementations, the first amplified light beam includes more than one pulse. For example, the first amplified light beam can include two pulses, separated from each other in time, and having different energies and durations. FIG. 9 shows an example in which the first amplified light beam includes more than one pulse. Further, the first amplified light beam can be a single pulse that has a shape (energy or intensity as a function of time) to provide an effect that is similar to that achieved by multiple pre-pulses. The second amplified light beam has energy sufficient to convert the target material droplet into a collection of pieces.

A second amplified light beam is directed toward the collection of pieces to convert the particles 20 to plasma that emits EUV light (430). The second amplified light beam can be referred to as the "main pulse." The amplified light beam 316 of FIG. 3A is an example of a second amplified light beam. The amplified light beam 316 has sufficient energy to convert all or most of the particles 20 of the target 5 into plasma that emits EUV light.

Figure 5:
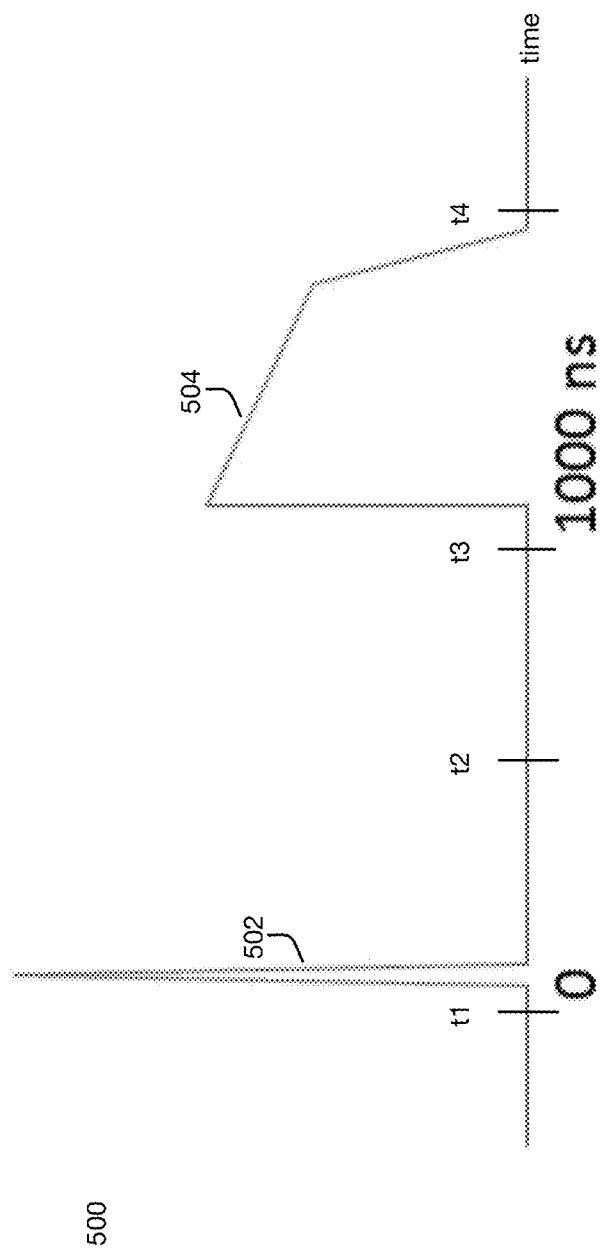
FIG. 5 is a plot of an exemplary waveform for transforming a target material droplet into a hemisphere shaped target.

Referring to FIG. 5, an example of a waveform 500 that can be used to transform a target material droplet into a hemisphere shaped target is shown. FIG. 5 shows the amplitude of the waveform 500 as a function of time. The waveform 500 shows a representation of the collection of amplified light beams that strike a particular target material droplet in a single cycle of operation of the EUV light source. A cycle of operation is a cycle that emits a pulse or burst of EUV light. The waveform 500 also can be referred to as a laser train 500 or a pulse train 500. In the waveform 500, the collection of amplified light beams includes a pre-pulse 502 and a main pulse 504.

The pre-pulse 502 begins at time t=0, and the main pulse 504 begins at a time t=1000 ns. In other words, the main pulse 504 occurs 1000 ns after the pre-pulse 502. In the waveform 500, the pre-pulse 502 can have a wavelength of 1.0 μm, a duration of 150 ps, an energy of 10 mJ, a focal spot 60 μm in diameter, and an intensity of $2 \times 10^{12}$ W/cm². This is an example of one implementation of the waveform 500. Other parameter values can be used, and the parameter values of the pre-pulse 502 can vary by a factor of 5 as compared to this example. For example, in some implementations, the pre-pulse 502 can have a duration of 5-20 ps, and an energy of 1-20 mJ. The main pulse 504 can have a wavelength of 5-11 μm, a pulse duration of 15-200 ns, a focus spot size of 50-300 μm, and an intensity of $3 \times 10^9$ to $8 \times 10^1$) W/cm². For example, the main pulse 504 can have a wavelength of 10.59 μm and a pulse duration of 130 ns. In another example, the main pulse can have a wavelength of 10.59 μm and a pulse duration of 50 ns or less.

In addition to the times t=0 and t=1000 ns, the times $t_1$-$t_4$ are also shown on the time axis. The time $t_1$ is shortly before the pre-pulse 502 occurs. The time $t_2$ is after the pre-pulse 502 ends and before the main pulse 504 begins. The time t3 occurs shortly before the main pulse 504, and the time t4 occurs after the main pulse 504. The times $t_1$-$t_4$ are used in the discussion below, with respect to FIGS. 6A-6D, of a transformation of a target material droplet to a hemisphere shaped target using the waveform 500.

Although the waveform 500 is shown as a continuous waveform in time, the pre-pulse 502 and main pulse 504 that make up the waveform 500 can be generated by different sources. For example, the pre-pulse 502 can be a pulse of light generated by the pre-pulse source 324, and the main pulse 504 can be generated by the drive laser system 315. When the pre-pulse 502 and the main pulse 504 are generated by separate sources that are in different locations relative to the chamber 340 (FIG. 3A), the pre-pulse 502 and the main pulse 504 can be directed to the chamber 340 with the optical element 322.

Referring also to FIGS. 6A-6D, interactions between a target material droplet 610 and the waveform 500 that transform the target material droplet 610 into a hemisphere shaped target 614 are shown. A target supply apparatus 620 releases a stream of target material droplets 622 from an orifice 624. The target material droplets 622 travel in the "x" direction toward a target location 626. FIGS. 6A-6D show the target supply apparatus 620 and the droplet stream 622 at the times t=$t_1$, t=$t_2$, t=$t_3$, and t=$t_4$, respectively. FIG. 5 also shows the times t=$t_1$ through t=$t_4$ relative to the waveform 500.

Referring to FIG. 6A, the pre-pulse 502 approaches the target material droplet 610. The target material droplet 610 is a droplet of target material. The target material can be molten metal, such as molten tin. The target material droplet 610 is a continuous segment or piece of target material that has a uniform density in the "z" direction (the direction of propagation of the waveform 500). The cross-sectional size of a target material droplet can be, for example, between 20-40 μm. FIG. 7A shows the density of the target material droplet 610 as a function of position along the "z" direction. As shown in FIG. 7A, compared to free space, the target material droplet 610 presents a steep increase in density to the waveform 500.

The interaction between the pre-pulse 502 and the target material droplet 610 forms a collection of pieces of target material 612 that are arranged in a geometric distribution. The pieces of target material 612 are distributed in a hemisphere shaped volume that extends outward from a plane surface 613 in the "x" and "z" direction. The pieces of target material 612 can be a mist of nano- or micro-particles, separate pieces of molten metal, or a cloud of atomic vapor. The pieces of target material can be 1-10 μm in diameter.

A purpose of the interaction between the pre-pulse 502 and the target material droplet 610 is to form a target that has a spatial extent that is larger than the diameter of the main pulse 504 but without substantially ionizing the target. In this manner, as compared to a smaller target, the created target presents more target material to the main beam and can use more of the energy in the main pulse 504. The pieces of target material 612 have a spatial extent in the x-y and x-z planes that is larger than the extent of the target material droplet 610 in the x-y and x-z planes.

As time passes, the collection of pieces 612 travels in the "x" direction toward the target location 626. The collection of pieces 612 also expands in the "x" and "z" directions while moving toward the target location 626. The amount of spatial expansion depends on the duration and intensity of the pre-pulse 502, as well as the amount of time over which the collection of pieces 612 is allowed to expand. The density of the collection of pieces 612 decreases as time passes, because the pieces spread out. A lower density generally allows an oncoming light beam to be absorbed by more of the material in a volume, and a high density can prevent or reduce the amount of light absorbed and the amount of EUV light produced. A wall of high density through which light cannot pass or be absorbed and is instead reflected is the "critical density." However, the most efficient absorption by a material can occur near but below the critical density. Thus, it can be beneficial to for the target 614 to be formed by allowing the collection of pieces 614 to expand over a finite time period that is long enough to allow the collection of pieces 613 to expand spatially without being so long that the density of the pieces decreases to a point where the efficiency of laser absorption decreases. The finite time period can be the time between the pre-pulse 502 and the main pulse 504 and can be, for example, about 1000 ns.

Figures 8A, 8B:
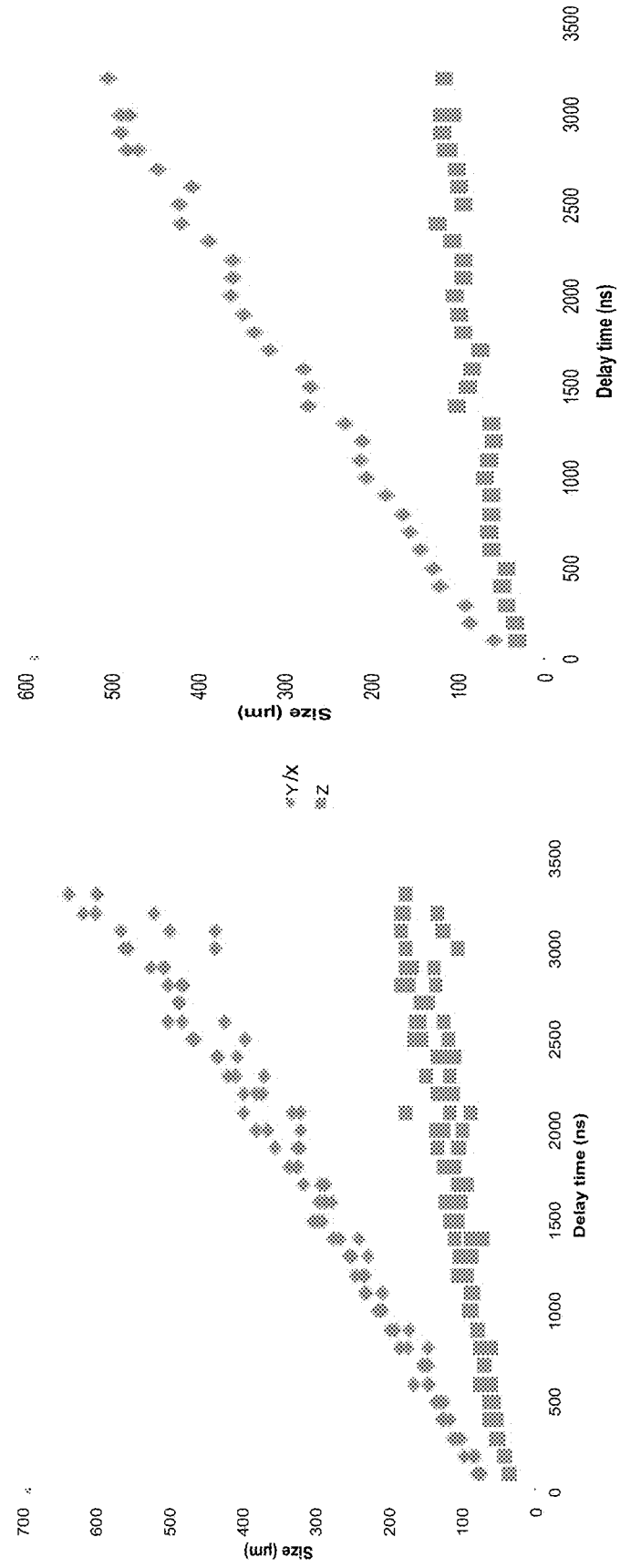
FIGS. 8A and 8B are plots of the target size, which shows the spatial extent of a hemisphere shaped target, as a function of time.

Referring also to FIGS. 8A and 8B, examples of the spatial expansion of the collection of pieces 612 as a function of time after the pre-pulse strikes a target material droplet for two different pre-pulses are shown, with FIG. 8A showing an example for a pre-pulse similar to the pre-pulse 502. The time after the pre-pulse strikes a target material droplet can be referred to as the delay time. FIG. 8A shows the size of the collection of pieces 612 as a function of delay time when the pre-pulse has a wavelength of 1.0 μm, a duration of 150 ps, an energy of 10 mJ, a focal spot 60 μm in diameter, and an intensity of $2 \times 10^{12}$ W/cm². FIG. 8B shows the size of the collection of pieces 612 as a function of delay time when the pre-pulse has a wavelength of 1.0 μm, a duration of 150 ps, an energy of 5 mJ, a focal spot 60 μm in diameter, and an intensity of $1 \times 10^{12}$ W/cm². Comparing FIG. 8A to FIG. 8B shows that the collection of pieces 612 expands more rapidly in the vertical directions (x/y) when struck by the more energetic and more intense pre-pulse of FIG. 8A.

Referring again to, FIG. 6C the target material droplet 610 and the stream of droplets 622 are shown at the time=$t_3$. At the time=$t_3$, the collection of target material pieces 612 has expanded into the hemisphere shaped target 614 and arrives at the target location 626. The mail pulse 504 approaches the hemisphere shaped target 614.

FIG. 7B shows the density of the hemisphere shaped target 614 just before the main pulse 504 reaches the target 614. The density is expressed as density gradient 705 that is density of particles 612 in the target 614 a function of position in the "z" direction, with z=0 being the plane surface 613. As shown, the density is minimum at the plane surface 613 and increases in the "z" direction. Because the density is at a minimum at the plane surface 613, and the minimum density is lower than that of the target material droplet 610, compared to the target material droplet 610, the main pulse 504 enters the target 614 relatively easily (less of the main pulse 504 is absorbed).

As the main beam 504 travels in the target 614, the particles 612 absorb the energy in the main beam 504 and are converted to plasma that emits EUV light. The density of the target 614 increases in the direction of propagation "z" and can increase to an amount where the main beam 504 cannot penetrate and is instead reflected. The location in the target 614 with such a density is the critical surface (not shown). However, because the density of the target 614 is initially relatively low, a majority, most, or all, of the main beam 504 is absorbed by the particles 615 prior to reaching the critical surface. Thus, the density gradient provides a target that is favorable for EUV light generation.

Additionally, because the hemisphere shaped target 614 does not have a wall of high density, the EUV light 618 is radially emitted from the target 614 in all directions. This is unlike a disk shaped target or other target with a higher density, where the interaction between the main pulse and the target generates plasma and a shock wave that blows off some of the target as dense target material in the direction of propagation of the main pulse 504. The blown off material reduces the amount of material available for conversion to plasma and also absorbs some of the EUV light emitted in the forward ("z") direction. As a result, the EUV light is emitted over $2\pi$ steradians, and only half of the EUV light is available for collection.

However, the hemisphere shaped target 614 allows collection of EUV light in all directions ($4\pi$ steradians). After the main pulse 504 irradiates the hemisphere shaped target 614, there is negligible or no dense target material left in the hemisphere shaped target 614, and the EUV light 618 is able to escape the hemisphere shaped target 614 radially in all directions. In effect, there is very little matter present to block or absorb the EUV light 618 and prevent it from escaping. In some implementations, the EUV light 618 can be isotropic (uniform intensity) in all directions.

Thus, the hemisphere shaped target 614 provides additional EUV light by allowing EUV light 619, which is generated in the forward direction, to escape the hemisphere shaped target 614. Because the hemisphere shaped target 614 emits EUV light in all directions, a light source that uses the hemisphere shaped target 614 can have increased conversion efficiency (CE) as compared to a light source that uses a target that emits light over only $2\pi$ steradians. For example, when measured over $2\pi$ steradians, a hemisphere shaped target that is irradiated with a MOPA $CO_2$ main pulse having a duration of 130 ns can have a conversion efficiency of 3.2%, meaning that 3.2% of the $CO_2$ main pulse is converted into EUV light. When the hemisphere shaped target is irradiated with a MOPA $CO_2$ main pulse having a duration of 50 ns, the conversion efficiency is 5% based on measuring the EUV light emitted over $2\pi$ steradians. When the EUV light is measured over $4\pi$ steradians, the conversion efficiency is doubled because the amount of EUV light emitted from the target is doubled. Thus, the conversion efficiency for the two main pulses becomes 6.4% and 10%, respectively.

In the example of FIGS. 6A-6D, the waveform 500, which has a delay time of 1000 ns between the pre-pulse 502 and the main pulse 504, is used to transform the target material droplet 610 into the hemisphere shaped target 614. However, other waveforms with other delay times can be used for the transformation. For example, the delay between the pre-pulse 502 and the main pulse 504 can be between 200 ns and 1600 ns. A longer delay time provides a target with a larger spatial extent (volume) and a lower density of target material. A shorter delay time provides a target with a smaller spatial extent (volume) and a higher density of target material.

FIG. 9 shows another exemplary waveform 900 that, when applied to a target material droplet, transforms the target material droplet to a hemisphere shaped target. The waveform 900 includes a first pre-pulse 902, a second pre-pulse 904, and a main pulse 906. The first pre-pulse 902 and the second pre-pulse 904 can be collectively considered as the first amplified light beam, and the main pulse 906 can be considered as the second amplified light beam. The first pre-pulse 902 occurs at time t=0, the second pre-pulse 904 occurs 200 ns later at time t=200 ns, and the main pulse 906 occurs at time t=1200 ns, 1200 ns after the first pre-pulse 902.

In the example of FIG. 9, the first pre-pulse 502 has a duration of 1-10 ns, and the second pre-pulse 504 has a duration of less than 1 ns. For example, the duration of the second pre-pulse 504 can be 150 ps. The first pre-pulse 502 and the second pre-pulse 504 can have a wavelength of 1 μm. The main pulse 506 can be a pulse from a $CO_2$ laser that has a wavelength of 10.6 μm and a duration of 130 ns or 50 ns.

FIGS. 10A-10D show the waveform 900 interacting with a target material droplet 1010 to transform the target material droplet 1010 into a hemisphere shaped target 1018. FIGS. 10A-10D show times t=$t_1$ to $t_4$, respectively. Times t=$t_1$ to $t_4$ are shown relative to the waveform 900 on FIG. 9. The time t=$t_1$ occurs just before the first pre-pulse 502, and the time t=$t_2$ occurs just before the second pre-pulse 504. The time t=$t_3$ occurs just before the main pulse 506, and the time t=t4 occurs just after the main pulse 506.

Figures 11A, 11B, 11C:
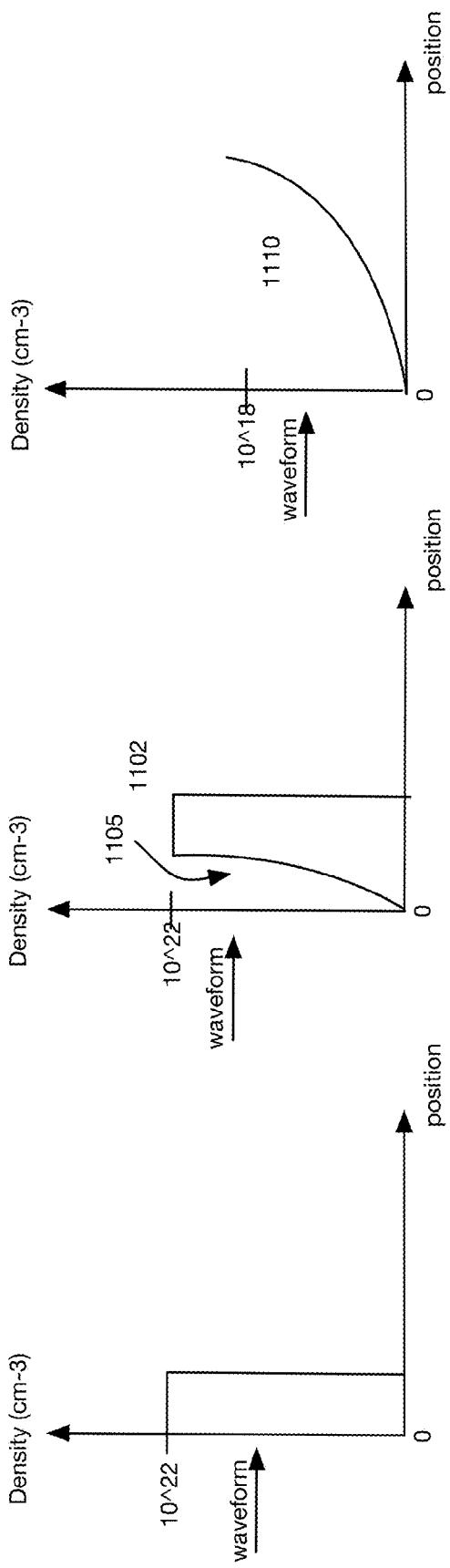
FIGS. 11A-11C are plots of exemplary density profiles as a function of spatial location.

Referring to FIG. 10A, a target material supply apparatus 1020 releases a stream of target material droplets 1022. The stream 1022 travels from the target material supply apparatus 1020 to a target location 1026. The stream 1022 includes target material droplets 1010 and 1011. The first pre-pulse 502 approaches and strikes the target material droplet 1010. The cross-sectional size of a target material droplet can be, for example, between 20-40 μm. Referring also to FIG. 11A, the density profile 1100 of the target material droplet 1010 is uniform in the direction of propagation "z" of the pre-pulse 502, and the target material droplet 1010 presents a steep density transition to the pre-pulse 502.

The interaction between the first pre-pulse 502 and the target material droplet 1010 produces a short-scale plume 1012 (FIG. 10B) on a side of the target material droplet 1010 that faces the oncoming first pre-pulse 902. The plume 1012 can be a cloud of particles of the target material that is formed on or adjacent to the surface of the target material droplet 1010. As the target material droplet 1010 travels toward the target location 1026, the target material droplet 1010 can increase in size in the vertical "x" direction and decrease in size in the "z" direction. Together, the plume 1012 and the target material droplet 1010 can be considered as an intermediate target 1014. The intermediate target 1014 receives the second pre-pulse 504.

Referring also to FIG. 18B, at the time $t=t_2$, the intermediate target 1014 has a density profile 1102. The density profile includes a density gradient 1105 that corresponds to the portion of the intermediate target 1014 that is the plume 1012. The density gradient 1105 is minimum at a location 1013 (FIG. 10B) where the second pre-pulse 504 initially interacts with the plume 1012. The density gradient 1105 increases in the direction "z" until the plume 1012 ends and the target material 1010 is reached. Thus, the first pre-pulse 502 acts to create an initial density gradient that includes densities that are lower than those present in the target material droplet 1010, thereby enabling the intermediate target 1014 to absorb the second pre-pulse 504 more readily than the target material droplet 1010.

The second pre-pulse 504 strikes the intermediate target 1014 and generates a collection of pieces of target material 1015. The interaction between the intermediate target 1014 and the second pre-pulse 504 generates the collection of pieces 1015, as shown in FIG. 10C. As time passes, the collection of pieces of target material 1015 continues to travel in the "x" direction toward the target location 1026. The collection of pieces of target material 1015 forms a volume, and the volume increases as the pieces expand with the passage of time. Referring to FIG. 10D, the collection of pieces expands for 1000 ns after the second pre-pulse 502 strikes the intermediate target 1014, and the expanded collection of pieces forms the hemisphere shaped target 1018. The hemisphere shaped target 1018 enters the target location 1016 at time $t=t4$. The hemisphere shaped target 1018 has density that is at a minimum at a surface plane 1019, which receives the main pulse 506, and increases in the "z" direction.

The density profile 1110 of the hemisphere shaped target 1018 at a time just before the main pulse 506 strikes the target 1018 is shown in FIG. 11C. The hemisphere shaped target 1018 has a gentle gradient that is at a minimum at the surface plane 1019 that receives the main pulse 506. Thus, like the hemisphere target 614, the hemisphere target 1018 absorbs the main pulse 506 readily and emits EUV light 1030 in all directions. As compared to the hemisphere target 614, the maximum density of the target 1018 is lower and the gradient is less steep.

Other implementations are within the scope of the following claims. For example, the shape of the target can vary from a hemisphere that has a rounded surface. The hemisphere shaped portion 14 of the hemisphere shaped target 5 can have one or more sides that are flattened instead of being rounded. In addition to, or alternatively to, being dispersed throughout the hemisphere shaped target 5, the particles 20 can be dispersed on a surface of the hemisphere shaped target 5.

What is claimed is:

1. A method comprising:
   providing a target;
   directing a first amplified light beam toward the target to cause an interaction between the target and the first amplified light beam, the interaction between the target and the first amplified light beam forming a first plasma and a remaining portion of the target;
   allowing the first plasma to expand to form a collection of pieces from the remaining portion, the collection of pieces extending along the direction of propagation of the first amplified light beam; and
   directing a second amplified light beam toward the collection of pieces, the second amplified light beam having an energy sufficient to convert at least some of the pieces of the collection of pieces into a plasma that emits EUV light, wherein
   the collection of pieces comprises non-ionized pieces of a target material that emits EUV light when in a plasma state.

2. The method of claim 1, wherein the first plasma does not emit EUV light.

3. The method of claim 1, wherein the first plasma is formed at a surface of the remaining portion of the target.

4. The method of claim 3, wherein allowing the first plasma to expand comprises allowing time to elapse after the interaction between the first amplified light beam and the target.

5. The method of claim 3, wherein the collection of pieces spreads into a non-spherical volume.

6. The method of claim 1, wherein at least some of the pieces in the collection of pieces are separated by voids.

7. The method of claim 1, wherein at least some of the pieces in the collection of pieces make physical contact with at least one other piece in the collection of pieces.

8. The method of claim 1, wherein the collection of pieces comprises a mist of particles of a target material that emits EUV light when in a plasma state.

9. The method of claim 1, wherein the first amplified light beam has a temporal duration.

10. The method of claim 9, wherein the temporal duration is 5-20 picoseconds (ps).

11. The method of claim 9, wherein the temporal duration is 150 ps or less.

12. The method of claim 1, wherein
    the second amplified light beam interacts with the collection of pieces at a target location,
    the second amplified light beam has a beam diameter in a direction that is different from a direction of propagation of the second amplified light beam, and
    at the target location, the collection of pieces has a spatial extent in the direction, the spatial extent of the collection of pieces being at least as large as the beam diameter of the second amplified light beam.

13. The method of claim 1, wherein the collection of pieces has a spatial extent in at least one dimension that is greater than a spatial extent of the target in the same dimension.

14. The method of claim 1, wherein the target comprises a coalesced piece of a target material a target material that emits EUV light when in a plasma state.

15. The method of claim 14, wherein the target material comprises tin.

16. The method of claim 1, wherein the first amplified light beam comprises a pulse of light, the pulse of light comprising a leading edge that interacts with the target before any other portion of the pulse of light, and the interaction between the leading edge and the target forms the first plasma.

17. The method of claim 16, further comprising causing an interaction between a portion of the first amplified light beam that occurs after the leading edge and the first plasma, the first plasma absorbing at least some the first amplified light beam that occurs after the leading edge.

18. The method of claim 1, wherein the collection of pieces forms a hemisphere-shaped volume.

19. The method of claim 18, wherein the hemisphere-shaped volume comprises a planar portion and a rounded portion, the second amplified light beam interacting with the planar portion prior to interacting with the rounded portion.

20. A method comprising:
    providing a target, the target comprising a target material that emits extreme ultraviolet (EUV) light when in a plasma state;

directing a first amplified light beam toward the target to cause an interaction between the first amplified light beam and the target, the interaction forming a first plasma and a remaining portion of the target; and allowing the first plasma to expand at a surface of the remaining portion of the target to transform the remaining portion of the target into a collection of pieces, the collection of pieces comprising pieces of the target material and extending along a direction of propagation of the first amplified light beam, wherein a density of the collection of pieces increases along a direction that is parallel to a direction of propagation of the second amplified light beam.

21. The method of claim 20, further comprising:
directing a second amplified light beam toward the collection of pieces, the second amplified light beam having an energy sufficient to convert the pieces of target material to a plasma that emits EUV light.

22. An extreme ultraviolet (EUV) light source comprising:
a first source that produces at least one pulse of light having a temporal duration of 5-20 picoseconds (ps);
a second source that produces an amplified light beam having an energy sufficient to convert a target material to a plasma that emits EUV light;
a target material delivery system that provides a target to a target location, the target comprising the target material, wherein
an interaction between a pulse of light from the first source and the target generates a shock wave that breaks the target into a collection of pieces that extends along the direction of propagation of the first amplified light beam, and
an interaction between the amplified light beam and the collection of pieces generates a plasma that emits EUV light.

23. The light source of claim 22, wherein the first source and the second source are part of the same source.

24. The light source of claim 22, wherein the at least one pulse of light produced by the first source has a first wavelength, and the amplified light beam produced by the second source has a second wavelength, the first and second wavelengths being different.

25. The light source of claim 24, wherein the first wavelength comprises 1.06 microns (μm), and the second wavelength comprises 10.6 μm.

26. A method comprising:
providing a target;
directing a first amplified light beam toward the target to cause an interaction between the target and the first amplified light beam, the interaction between the target and the first amplified light beam forming a first plasma and a remaining portion of the target;

allowing the first plasma to expand to form a collection of pieces from the remaining portion, the collection of pieces extending along the direction of propagation of the first amplified light beam; and directing a second amplified light beam toward the collection of pieces, the second amplified light beam having an energy sufficient to convert at least some of the pieces of the collection of pieces into a plasma that emits EUV light, wherein the collection of pieces comprises a mist of particles of target material that emits EUV light when in a plasma state.

27. The method of claim 26, wherein the collection of pieces forms a hemisphere-shaped volume.

28. The method of claim 27, wherein the hemisphere-shaped volume comprises a planar portion and a rounded portion, the second amplified light beam interacting with the planar portion prior to interacting with the rounded portion.

29. The method of claim 26, wherein the at first amplified light beam has a first wavelength, and the second amplified light beam has a second wavelength, the first and second wavelengths being different.

30. The method of claim 26, wherein the mist of particles is distributed throughout a volume, and the first amplified light beam has an intensity of $2 \times 10^{12}$ W/cm$^2$.

31. A method comprising:
providing a target;
directing a first amplified light beam toward the target to cause an interaction between the target and the first amplified light beam, the interaction between the target and the first amplified light beam forming a first plasma and a remaining portion of the target;

allowing the first plasma to expand to form a collection of pieces from the remaining portion, the collection of pieces extending along the direction of propagation of the first amplified light beam; and directing a second amplified light beam toward the collection of pieces, the second amplified light beam having an energy sufficient to convert at least some of the pieces of the collection of pieces into a plasma that emits EUV light, wherein the first amplified light beam has a temporal duration of 5-20 ps.

* * * * *